US009819951B2

(12) United States Patent
Makela

(10) Patent No.: US 9,819,951 B2
(45) Date of Patent: Nov. 14, 2017

(54) IMAGE PROCESSING METHOD, DEVICES AND SYSTEM

(71) Applicant: Nokia Technologies Oy, Espoo (FI)

(72) Inventor: Christian Markus Makela, Tampere (FI)

(73) Assignee: Nokia Technologies Oy, Espoo (FI)

( * ) Notice: Subject to any disclaimer, the term of this patent is extended or adjusted under 35 U.S.C. 154(b) by 135 days.

(21) Appl. No.: 14/432,896

(22) PCT Filed: Oct. 18, 2012

(86) PCT No.: PCT/FI2012/051002
§ 371 (c)(1),
(2) Date: Apr. 1, 2015

(87) PCT Pub. No.: WO2014/060637
PCT Pub. Date: Apr. 24, 2014

(65) Prior Publication Data
US 2015/0281714 A1    Oct. 1, 2015

(51) Int. Cl.
*H04N 19/42* (2014.01)
*H04N 19/63* (2014.01)
(Continued)

(52) U.S. Cl.
CPC ......... *H04N 19/436* (2014.11); *G06F 17/145* (2013.01); *G06F 17/148* (2013.01);
(Continued)

(58) Field of Classification Search
CPC combination set(s) only.
See application file for complete search history.

(56) References Cited

U.S. PATENT DOCUMENTS 6,148,111 A * 11/2000 Creusere ............... H04N 19/647
                                                    348/408.1
6,973,469 B1 * 12/2005 Hsu ........................ G06F 17/147
                                                    708/400
(Continued)

FOREIGN PATENT DOCUMENTS

JP    WO 2011064898     *    6/2011   ......... G06F 15/8015
JP    WO 2011064898 A1 *    6/2011   ......... G06F 15/8015
(Continued)

OTHER PUBLICATIONS

Shahbahrami, A., Juurlink, B., Borodin, D. et al. Int J Parallel Prog (2006) 34: 237. doi:10.1007/s10766-006-0015-0.*
(Continued)

*Primary Examiner* — Utpal Shah
(74) *Attorney, Agent, or Firm* — Alston & Bird LLP

(57) ABSTRACT

The invention relates to methods, devices, systems and computer program products where input image data is received for processing in a computer system, a first transform is carried out to the input image data, the transform being done in a first direction with respect to the input image data, to obtain first transformed image data, a transposing operation is carried out to the first transformed image data to obtain first transposed image data, and a second transform in a transform is carried out to the first transposed image data, the second transform being done in a second direction with respect to the input image data, to obtain second transformed image data. The first transform and the second transform may be carried out in a processor in a parallel manner, and the transposing operation may be carried out at least partially using registers of the processor.

23 Claims, 10 Drawing Sheets

(51) Int. Cl.
  *H04N 19/436* (2014.01)
  *G06T 1/20* (2006.01)
  *G06F 17/14* (2006.01)
  *H04N 19/635* (2014.01)
  *H04N 19/645* (2014.01)
(52) U.S. Cl.
  CPC .............. *G06T 1/20* (2013.01); *H04N 19/42* (2014.11); *H04N 19/63* (2014.11); *H04N 19/635* (2014.11); *H04N 19/645* (2014.11)

(56) References Cited

U.S. PATENT DOCUMENTS

| | | | |
|---|---|---|---|
| 7,096,245 B2 | 8/2006 | Hsiun et al. | |
| 7,634,525 B2* | 12/2009 | Hou | G06F 17/147 708/400 |
| 2004/0047512 A1* | 3/2004 | Handley | H04N 19/122 382/250 |
| 2005/0008247 A1 | 1/2005 | Kuo | |
| 2007/0076962 A1* | 4/2007 | Kodama | H04N 19/63 382/232 |
| 2010/0266008 A1* | 10/2010 | Reznik | G06F 17/147 375/240.2 |
| 2012/0087582 A1 | 4/2012 | Bauchot et al. | |
| 2012/0166502 A1 | 6/2012 | Chen et al. | |
| 2014/0043347 A1* | 2/2014 | Lee | G06T 1/20 345/522 |

FOREIGN PATENT DOCUMENTS

| | | |
|---|---|---|
| WO | 2004017157 A2 | 2/2004 |
| WO | 2011/064898 A1 | 6/2011 |

OTHER PUBLICATIONS

"Discrete Wavelet Transform", Wikipedia, Retrieved on Jul. 7, 2016, Webpage available at: https://en.wikipedia.org/wiki/Discrete_wavelet_transform.

"Haar Wavelet", Wikipedia, Retrieved on Jul. 7, 2016, Webpage available at: https://en.wikipedia.org/wiki/Haar_wavelet.

"Neon", The Architecture for the Digital World, Retrieved on Jul. 7, 2016, Webpage available at: http://www.arm.com/products/processors/technologies/neon.php.

"Single-level Discrete 2-D Wavelet Transform", MathWorks, Retrieved on Jul. 7, 2016, Webpage available at: http://in.mathworks.com/help/wavelet/ref/dwt2.html?requestedDomain=in.mathworks.com.

"Image Processing", WaveMetrics, Retrieved on Jul. 7, 2016, Webpage available at: http://www.wavemetrics.net//doc/igorman/III-11%20Image%20Processing.pdf.

"Image Data Compression", The Consultative Committee for Space Data Systems, Draft Recommended standard, CCSDS 122.0-R-2, No. 2, Jul. 2005, 61 pages.

Extended European Search Report received for corresponding European Patent Application No. 12886512.8, dated May 6, 2016, 8 pages.

Calvin et al., "Matrix Transpose for Block Allocations on Torus and de Bruijn Networks", Journal of Parallel and Distributed Computing, vol. 34, No. 1, Apr. 10, 1996, pp. 36-49.

International Search Report and Written Opinion received for corresponding Patent Cooperation Treaty Application No. PCT/FI2012/051002, dated Aug. 14, 2013, 14 pages.

Shahbahrami, A, et al., "Avoiding Conversion and Rearrangement Overhead in SIMD Architectures". International Journal of Parallel Programming, vol. 34, No. 3, Jun. 2006, pp. 237-260,. Retrieved from the interneton Aug. 9, 2013 <URL: http://link.springer.com/article/10.1007%Fs10766-006-0015-0#>.

Coding for Neon—Part 5: Rearranging Vectors. ARM Community blog [online], Mar. 13, 2012 [retrieved on Sep. 8, 2013]. Retrieved from <URL: https://blogs.arm.com/software-enablement/684-coding-for-neon-part-5-rearranging-vectors/> Section "VTRN:Transpose".

* cited by examiner

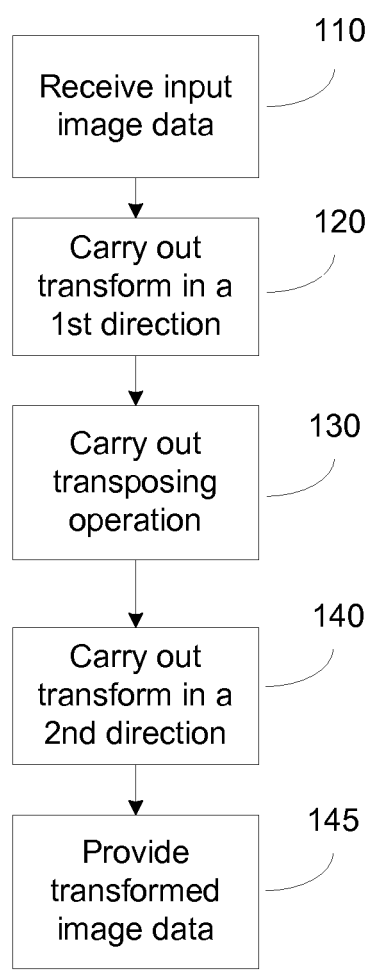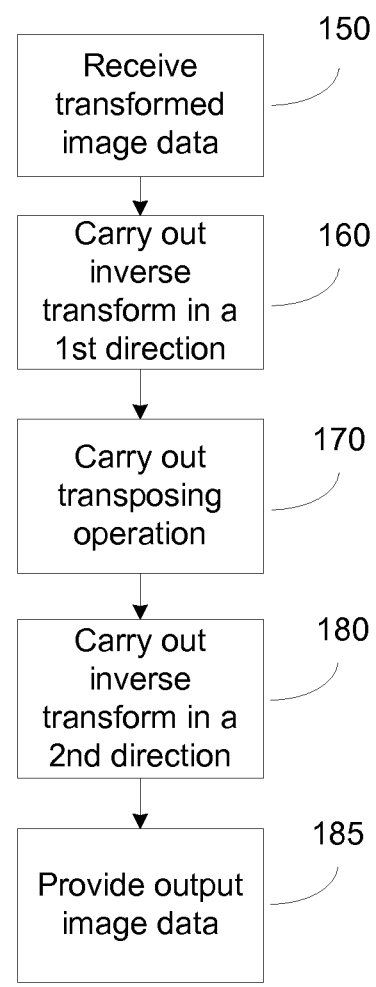
Fig. 1a
Fig. 1b

IMAGE PROCESSING METHOD, DEVICES AND SYSTEM

TECHNICAL FIELD

Various embodiments generally relate to image processing.

BACKGROUND

Various transforms for digital signal processing are almost always used when digital images are being coded or processed. Such transforms include the discrete cosine transform, fast Fourier transform, various transforms based on wavelet theory, the Hadamard transform, and others. Digital images are often produced by a camera, and the images can take the form of still images or be composed into a series of images, that is, a video image.

Transform-based image processing can be computationally intensive. For that reason, enhancements on both hardware and software used for computations in transforms have been developed. For example, suitable approximations of transforms have been developed so that they are fast to compute on a processor. On the other hand, processor architectures have been developed so that a large number of similar computations can be efficiently computed—this is often the case with digital image processing. However, hardware architectures often need to be adapted for many purposes, and may not be optimized for any single purpose.

There is, therefore, a need for solutions that enable efficient computation in transform-based image processing.

SUMMARY

Various aspects include a method, an apparatus, a server, a client and a computer readable medium comprising a computer program stored therein, which are characterized by what is stated in the independent claims. Some embodiments of the invention are disclosed in the dependent claims.

Various embodiments relate to methods, devices, systems and computer program products where input image data is received for processing in a computer system, a first transform is carried out to the input image data, the transform being done in a first direction with respect to the input image data, to obtain first transformed image data, a transposing operation is carried out to the first transformed image data to obtain first transposed image data, and a second transform is carried out to the first transposed image data, the second transform being done in a second direction with respect to the input image data, to obtain second transformed image data. The first transform and the second transform may be carried out in a processor in a parallel manner, and the transposing operation may be carried out at least partially using registers of the processor.

According to a first aspect, there is provided a method comprising receiving input image data, performing a first transform to said input image data in a first direction to obtain first transformed image data, performing a transposing operation to said first transformed image data to obtain first transposed image data, performing a second transform to said first transposed image data, said second transform in a second direction, to obtain second transformed image data.

According to an embodiment, the method comprises performing said first transform and said second transform in a processor in a parallel manner, and performing the transposing operation at least partially using registers of said processor. According to an embodiment, the method comprises performing said transposing operation by swapping element values of registers in register pairs iteratively such that individual element values are moved to transpose positions with respect to the image block being processed. According to an embodiment, the method comprises performing a transposing operation to said second transformed image data. According to an embodiment, said input image data is an image block of a larger image, and said larger image is processed in a block-by-block manner, and said method comprises performing a block transposing operation to said second transformed image data with respect to the larger image. According to an embodiment, the method comprises processing said second transformed image data thereby causing said input image data to be filtered, and forming an inverse transform of the processed second transformed image data to obtain filtered image data. According to an embodiment, said first and second transforms are performed in a processor having a single instruction multiple data (SIMD) architecture. According to an embodiment, said first and second transforms are wavelet transforms, such as Haar, Daubechies or complex wavelet transforms. According to an embodiment, said first and second transform is a Hadamard transform or a time-frequency transform such as a discrete cosine transform. According to an embodiment, said input image data pertains to a still image and said second transformed image data is used in a coded image such as a JPEG2000 image; or said input image data pertains to a sequence of images such as a video and said second transformed image data is used in a coded image stream such as a Motion JPEG2000 stream.

According to a second aspect there is provided an apparatus comprising at least one processor, memory including computer program code, the memory and the computer program code configured to, with the at least one processor, cause the apparatus to receive input image data for processing in a computer system, perform a first transform to said input image data, said transform in a first direction, to obtain first transformed image data, perform a transposing operation to said first transformed image data to obtain first transposed image data, perform a second transform to said first transposed image data, said second transform in a second direction, to obtain second transformed image data.

According to an embodiment, the apparatus comprises computer program code to cause the apparatus to perform said first transform and said second transform in a processor each in a parallel manner, and perform said transposing operation at least partially using registers of said processor. According to an embodiment, the apparatus comprises computer program code to cause the apparatus to perform said transposing operation by swapping element values of registers in register pairs iteratively such that individual element values are moved to transpose positions with respect to the image block being processed. According to an embodiment, the apparatus comprises computer program code to cause the apparatus to perform a transposing operation to said second transformed image data. According to an embodiment, said input image data is an image block of a larger image, and said larger image is processed in a block-by-block manner, and said apparatus comprises computer program code to cause the apparatus to perform a block transposing operation to said second transformed image data with respect to the larger image data. According to an embodiment, the apparatus comprises computer program code to cause the apparatus to process said second transformed image data and thereby to cause said input image data to be filtered, and form an inverse transform of the processed second transformed image data to obtain filtered image data. According to an embodiment, said first and second transforms are arranged to be performed in a processor of the apparatus having a single instruction multiple data (SIMD) architecture. According to an embodiment, said first and second transforms are wavelet transforms, such as Haar, Daubechies or complex wavelet transforms. According to an embodiment, said first and second transform is a Hadamard transform or a time-frequency transform such as a discrete cosine transform. According to an embodiment, said input image data pertains to a still image and said second transformed image data is arranged to be used in a coded image such as a JPEG2000 image; or said input image data pertains to a sequence of images such as a video and said second transformed image data is arranged to be used in a coded image stream such as a Motion JPEG2000 stream.

According to a third aspect there is provided an apparatus, comprising means for receiving input image data for processing in a computer system, means for performing a first transform to said input image data in a first direction to obtain first transformed image data, means for performing a transposing operation to said first transformed image data to obtain first transposed image data, means for performing a second transform to said first transposed image data, said second transform in a second direction, to obtain second transformed image data.

According to an embodiment, the apparatus comprises means for performing said first transform and said second transform in a processor each in a parallel manner, and means for performing said transposing operation at least partially using registers of said processor. According to an embodiment, the apparatus comprises means for performing said transposing operation by swapping element values of registers in register pairs iteratively such that individual element values are moved to transpose positions with respect to the image block being processed. According to an embodiment, the apparatus comprises means for performing a transposing operation to said second transformed image data. According to an embodiment, said input image data is an image block of a larger image, and said larger image is arranged to be processed in a block-by-block manner, and said apparatus comprises means for performing a block transposing operation to said second transformed image data with respect to the larger image data. According to an embodiment, the apparatus comprises means for processing said second transformed image data thereby causing said input image data to be filtered, and means for forming an inverse transform of the processed second transformed image data to obtain filtered image data. According to an embodiment, said first and second transforms are arranged to be performed in a processor of the apparatus having a single instruction multiple data (SIMD) architecture. According to an embodiment, said first and second transforms are wavelet transforms, such as Haar, Daubechies or complex wavelet transforms. According to an embodiment, said first and second transform is a Hadamard transform or a time-frequency transform such as a discrete cosine transform. According to an embodiment, said input image data pertains to a still image and said second transformed image data is arranged to be used in a coded image such as a JPEG2000 image; or said input image data pertains to a sequence of images such as a video and said second transformed image data is arranged to be used in a coded image stream such as a Motion JPEG2000 stream.

According to an embodiment of the second or third aspect, the apparatus comprises an electronic device comprising a user interface circuitry and user interface software configured to facilitate a user to control at least one function of the electronic device through use of a display and further configured to respond to user inputs, and a display circuitry configured to display at least a portion of a user interface of the electronic device, the display and display circuitry configured to facilitate the user to control at least one function of the electronic device. According to an embodiment, the electronic device comprises a mobile phone.

According to a fourth aspect there is provided a computer program product embodied on a non-transitory computer readable medium, comprising computer program code configured to, when executed on at least one processor, cause an apparatus or a system to receive input image data, perform a first transform to said input image data, said transform in a first direction, to obtain first transformed image data, perform a transposing operation to said first transformed image data to obtain first transposed image data, perform a second transform to said first transposed image data, said second transform in a second direction, to obtain second transformed image data.

According to an embodiment, the computer program product comprises computer program code to cause the apparatus or system to perform said first transform and said second transform in a processor each in a parallel manner, and perform said transposing operation at least partially using registers of said processor. According to an embodiment, the computer program product comprises computer program code to cause the apparatus or system to perform said transposing operation by swapping element values of registers in register pairs iteratively such that individual element values are moved to transpose positions with respect to the image block being processed. According to an embodiment, the computer program product comprises computer program code to cause the apparatus or system to perform a transposing operation to said second transformed image data. According to an embodiment, said input image data is an image block of a larger image, and said larger image is processed in a block-by-block manner, and said computer program product comprises computer program code to cause the apparatus or system to perform a block transposing operation to said second transformed image data with respect to the larger image data. According to an embodiment, the computer program product comprises computer program code to cause the apparatus or system to process said second transformed image data and thereby to cause said input image data to be filtered, and form an inverse transform of the processed second transformed image data to obtain filtered image data. According to an embodiment, said first and second transforms are arranged to be performed in a processor of the apparatus having a single instruction multiple data (SIMD) architecture. According to an embodiment, said first and second transforms are wavelet transforms, such as Haar, Daubechies or complex wavelet transforms. According to an embodiment, said first and second transform is a Hadamard transform or a time-frequency transform such as a discrete cosine transform. According to an embodiment, said input image data pertains to a still image and said second transformed image data is arranged to be used in a coded image such as a JPEG2000 image; or said input image data pertains to a sequence of images such as a video and said second transformed image data is arranged to be used in a coded image stream such as a Motion JPEG2000 stream.

According to a fifth aspect there is provided a system comprising at least one processor, memory including computer program code, the memory and the computer program code configured to, with the at least one processor, cause the system to perform the method according to the first aspect or any embodiments thereof.

According to a sixth aspect there is provided use of a transpose operation in an image transform between a horizontal and a vertical transform operation for enabling the utilization of parallel processing on a processor for both said horizontal and said vertical transform operation.

According to a seventh aspect there is provided a computer image product embodied as a data structure on a non-transitory computer readable medium, the computer image product comprising coefficients of transformed image data and control codes, said control codes being arranged to control decoding of the image data, and said control codes comprising an indicator indicating that said decoding can be performed by a decoding process with two transform operations and a transposing operation in between the transform operations such that a further transposing operation can be avoided in obtaining output image data suitable for presentation.

According to an embodiment said control codes comprise a transpose type indicator indicating the type of a transpose operation for carrying out said decoding process, for example a matrix transpose operation, a rotation.

DESCRIPTION OF THE DRAWINGS

In the following, various embodiments of the invention will be described in more detail with reference to the appended drawings, in which
FIGS. 1a and 1b
show methods for image processing according to an example, where a transposing operation is applied.

DESCRIPTION OF EXAMPLE EMBODIMENTS

Figure 2A:
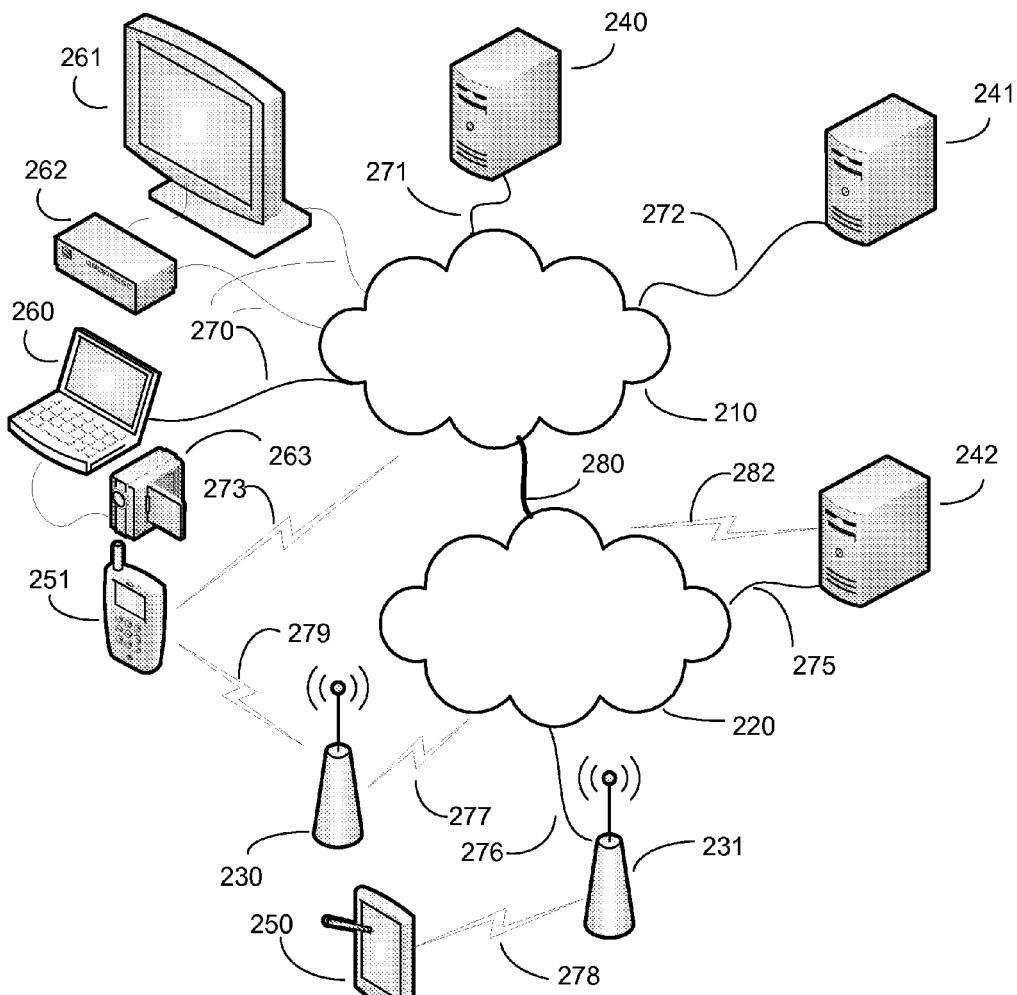
FIGS. 2a and 2b
show system and devices for image processing and transmission according to examples.

In the following, several embodiments of the invention will be described often in the context of a SIMD (single instruction multiple data) processor architecture and wavelet transforms. It is to be noted, however, that the invention is not limited to this processor architecture or these specific transforms. In fact, the different embodiments have applications in any environment where improvement in image processing speed is required. For example, various still image and video processing tasks on various processor architectures may benefit from the embodiments.

FIGS. 1a and 1b show methods for image processing according to an example, where a transposing operation is applied. In FIG. 1a, performing a two-directional (2D) transform is shown, and in FIG. 2a, the corresponding inverse transform is shown. In phase 110, input image data is received for example from a mass storage device or memory, or from an image capture device such as a camera. In phase 120, after being moved into the processor, the image data (or part of it) is subjected to a transform operation in a first direction with respect to the original image data. As is well known, images are often 2-dimensional (they may also be 3-dimensional), and therefore there exist at least two independent coordinate axes for the image, e.g. the horizontal and vertical axes. In the following, let these axes define the directions with respect to the original image data.

The transform of phase 120 may be accelerated by the use of a suitable processor architecture for the purpose. For example, an ARM processor with a NEON processing unit may be able to receive data and process data in a parallel manner. That is, a vector of, e.g., 8 words (16-bit integers) may be added or subtracted from another vector, thereby enabling a fast computation of 8 results with one instruction. Such processor architectures may be called single instruction multiple data (SIMD) architectures. The NEON architecture may, e.g., be suitable for processing 8×8 blocks of image data for the computation of the transform in the 1st direction with respect to the image data. However, the mentioned parallel architecture may not be suited for operating on the individual elements of a vector together with other elements of the same vector. Therefore, a transform in a second direction may be computed on a general-purpose processor such as the ARM processor.

It has been noticed here, however, that various ways of arranging the data after the first transform may enable the use of the parallel architecture for the transform in a second direction, as well. This is surprising, because a skilled person would expect the memory transfer operations in re-alignment of the data to be costly in terms of computation time (clock cycles). However, here several ways have been envisioned for overcoming this obstacle.

For this reason, a transposing operation may be carried out in phase 130. That is, the data output from phase 120 may be re-aligned with the processor parallel architecture by a transposing operation, for example by matrix transpose, or by rotation by 90 or 270 degrees. In this manner, between the transform in the 1st direction and the 2nd direction, a transposing operation is carried out.

In phase 140, a transform in the 2nd direction may be carried out employing the parallel processor architecture. In phase 145, the transformed image data may be provided e.g. to memory, as a file to a communication interface or mass storage, or for further processing or filtering. The transformed image data in phase 145 may be in a transposed format. Therefore, there may be control codes in the image file or stream indicating that the file or stream actually contains transposed images. This may be useful e.g. to know that pictures of people are in a horizontal direction instead of the normal vertical one. Transmitting or storing the images in transposed format may be beneficial e.g. to save time in the transform phase by avoiding an additional transpose operation, and to save time in the decoding phase (at the receiver or when opening the image file) by avoiding a transpose operation.

In FIG. 1b, the inverse transform is shown. The transformed image data is received in phase 150. In phase 160, inverse transform in a first direction with respect to the image data is carried out. As in FIG. 1a, a transposing operation is carried out in phase 170 to enable the exploitation of the parallel architecture of a processor for carrying out the inverse transform in phase 180 in a 2nd direction. The decoded image data may then be provided in phase 185 e.g. for viewing. If the transpose operation in phase cancelled out the transpose orientation of the input image data, no further transpose operation is necessary. Otherwise, such an operation may be carried out before providing the image data.

As is known in the art, the forward and inverse transforms are often almost similar, if not completely identical, and therefore in the following, only the forward transform is described in detail. It needs to be appreciated, however, that the following also applies to the inverse transform. Likewise, it needs to be appreciated that the following may be equally well applicable to still images and video images.

Figure 2B:
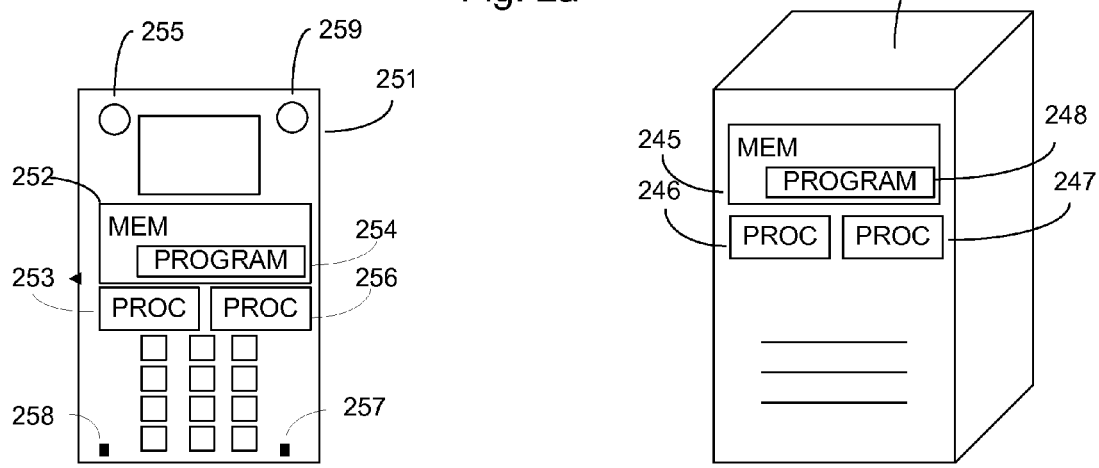

FIGS. 2a and 2b show system and devices for image processing and transmission according to examples. In FIG. 2a, the different devices may be connected via a fixed network 210 such as the Internet or a local area network; or a mobile communication network 220 such as the Global System for Mobile communications (GSM) network, 3rd Generation (3G) network, 3.5th Generation (3.5G) network, 4th Generation (4G) network, Wireless Local Area Network (WLAN), Bluetooth®, or other contemporary and future networks. Different networks are connected to each other by means of a communication interface 280. The networks comprise network elements such as routers and switches to handle data, and communication interfaces such as the base stations 230 and 231 in order for providing access for the different devices to the network, and the base stations 230, 231 are themselves connected to the mobile network 220 via a fixed connection 276 or a wireless connection 277.

There may be a number of servers connected to the network, and in the example of FIG. 2a are shown a server 240 for offering a network service for image storage and connected to the fixed network 210, a server 241 for processing (e.g. filtering) image data and connected to the fixed network 210, and a server 242 for offering a network service e.g. an image sharing service and connected to the mobile network 220. Some of the above devices, for example the computers 240, 241, 242 may be such that they make up the Internet with the communication elements residing in the fixed or wireless network 210.

There are also a number of end-user devices such as mobile phones and smart phones 251, Internet access devices (Internet tablets) 250, personal computers 260 of various sizes and formats, televisions and other viewing devices 261, video decoders and players 262, as well as video cameras 263 and other encoders. These devices 250, 251, 260, 261, 262 and 263 can also be made of multiple parts. The various devices may be connected to the networks 210 and 220 via communication connections such as a fixed connection 270, 271, 272 and 280 to the internet, a wireless connection 273 to the internet 210, a fixed connection 275 to the mobile network 220, and a wireless connection 278, 279 and 282 to the mobile network 220. The connections 271-282 are implemented by means of communication interfaces at the respective ends of the communication connection. The various devices may create, transform, send, receive, decode and display images according to example embodiments.

FIG. 2b shows devices for processing image data according to an embodiment. As shown in FIG. 2b, the server 240 contains memory 245, one or more processors 246, 247, and computer program code 248 residing in the memory 245 for implementing, for example, image data transform functionality. The different servers 241, 242 may contain at least these same elements for employing functionality relevant to each server. Similarly, the end-user device 251 contains memory 252, at least one processor 253 and 256, and computer program code 254 residing in the memory 252 for implementing, for example, encoding of image data from the device camera. The end-user device may have one or more cameras 255 and 259 for capturing image data, for example video or still images. The end-user device may also contain one, two or more microphones 257 and 258 for capturing sound. The different end-user devices 250, 260 may contain at least these same elements for employing functionality relevant to each device. The end user devices may also comprise a screen for viewing a graphical user interface. The end-user devices and servers may also comprise various communication modules or communication functionalities implemented in one module for communicating with other devices.

The various end-user devices and servers may take the form of communication devices, or other devices having communication capability. For example, the devices may be toys, home appliances like kitchen machines, entertainment devices (TV, music/media devices), or even parts of the building, clothes, vehicles, or any other devices that may communicate with each other.

It needs to be understood that different embodiments allow different parts to be carried out in different elements. For example, receiving and transforming image data may be carried out entirely in one user device like 250, 251 or 260, or in one server device 240, 241, or 242, or across multiple user devices 250, 251, 260 or across multiple network devices 240, 241, 242, or across both user devices 250, 251, 260 and network devices 240, 241, 242. For example, the image data may be formed and stored in one device, the transform of the image data may happen in another device and the decoding may be carried out in a third device (e.g. a server). The relevant software for carrying out the functionality may reside on one device or distributed across several devices, as mentioned above, for example so that the devices form a so-called cloud.

The different embodiments may be implemented as software running on mobile devices and optionally on servers. The mobile phones may be equipped at least with a memory, processor, display, keypad, motion detector hardware, and communication means such as 2G, 3G, WLAN, or other. The different devices may have hardware like a touch screen (single-touch or multi-touch) and means for positioning like network positioning or a global positioning system (GPS) module. There may be various applications on the devices such as a calendar application, a contacts application, a map application, a messaging application, a browser application, a gallery application, a video player application and various other applications for office and/or private use. The devices may have various communication modules for communicating with other devices.

Figure 3A:
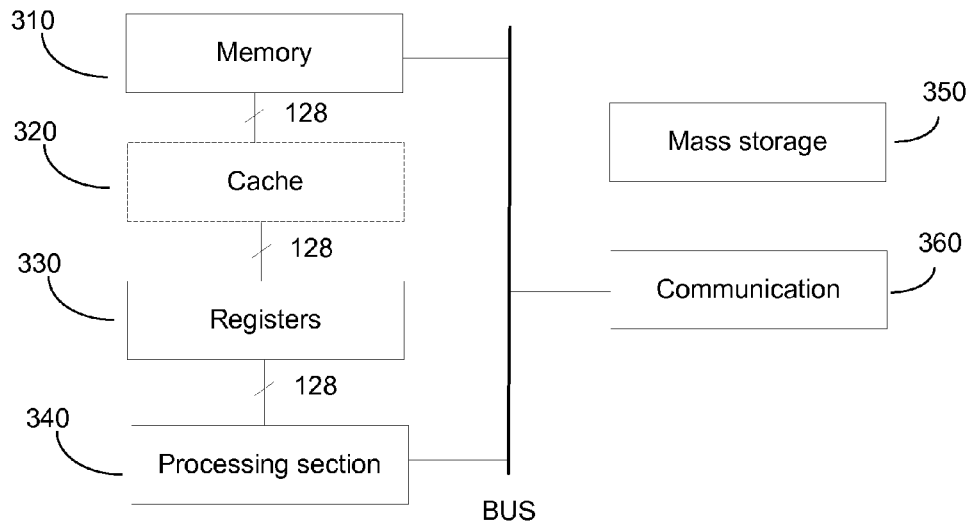
FIGS. 3a and 3b
show a block diagram of a processing architectures according to an example.
Figure 3B:
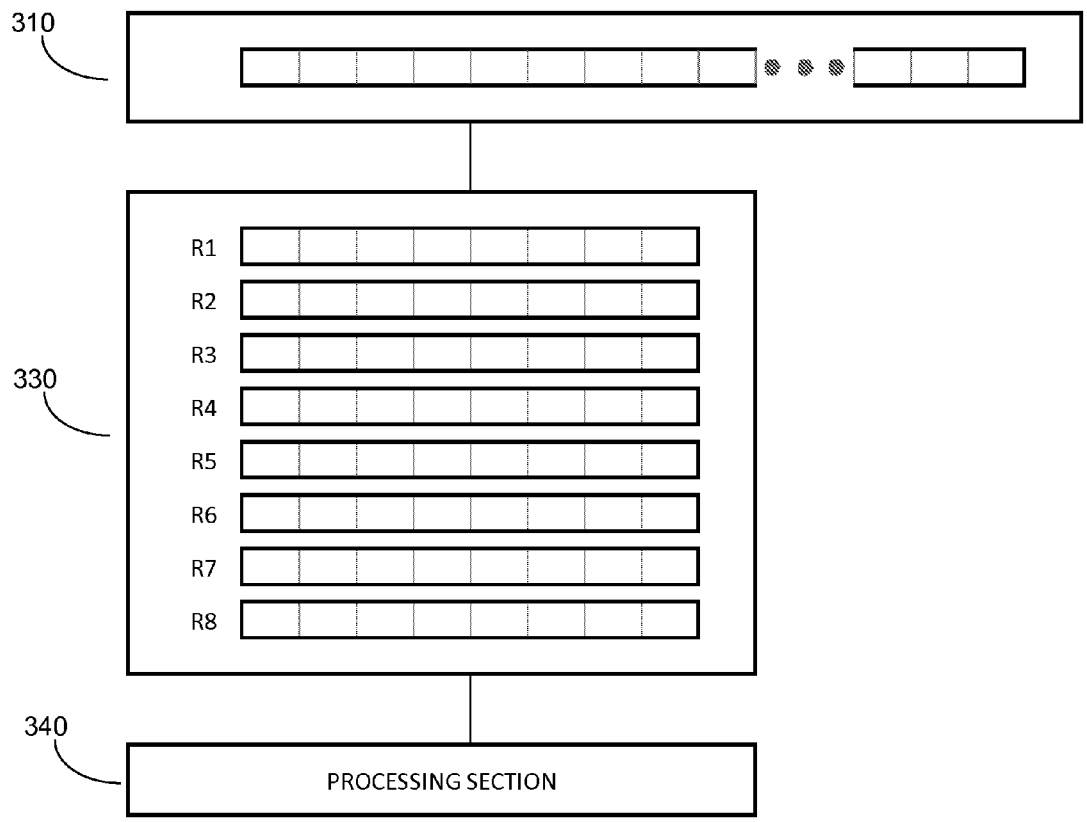

FIGS. 3a and 3b show a block diagram of a processing architectures according to an example. A computer architecture may, for example, have elements like those shown in FIG. 3a. A computer may have memory (310) connected to the registers (330) of a processor (340), and the memory may be accessible from a data/control bus (BUS), as well. There may be a cache (320) for providing a fast-access pipeline of data to the processor. That is, data that has been used or will be used soon may be fetched and stored temporarily in the cache, and the cache may be arranged near the registers 330 and the processor so that data may be transferred fast to the processor for computations. The operations of a cache may is omitted in the following, but it needs to be understood that a cache or multiple caches may exist. A mass storage 350 like a hard drive and a communication module 360, for example to a fixed n1etwork or a wireless network. Images for processing and processed images may be stored onto the mass storage and/or sent over the communications connection 360 to other devices. In FIG. 3a, the data connection between the elements, e.g. between memory, cache and register may be e.g. 128 bits, as shown, or any other width. The width of the data connection may allow parallel transfer of multiple data words to/from the registers.

In FIG. 3b, some operations of a parallel architecture (vector computing) are illustrated. Such operations may be carried out for example in an ARM NEON architecture. Architectures where a plurality of data units such as integer words or floating point numbers may be operated on in a parallel manner with one instruction on the processor may also be called single instruction multiple data (SIMD) architectures. In FIG. 3b, the memory 310 is connected to the registers 330 of the processor, that is, data from the memory 310 may be transferred to registers R1 . . . R8 and vice versa. For efficiency, the data from several memory locations of memory 310 may be loaded with one instruction to a register, e.g. register R1. This may happen so that for example 8 words (memory locations) of 16 bits each are transferred to a register R1 of 128 bits in length. In FIG. 3a as in many architectures, the data from memory is loaded as one contiguous section. Also, it may be possible to load data from a memory in an alternating manner, e.g. a first word to register R1, a second word to register R2, a third word to register R3, a fourth word to register R1, a fifth word to register R2, a sixth word to register R3, and so on. Such parallel register-memory data transfers may improve the computation efficiency e.g. in image processing.

The registers 330, e.g. a register R1 may have a length larger than a normal data unit, for example 64, 128, 256, 512, 1024 bits or more, or a number not being a two's power but being merely a multiple of a data word length, e.g. 320 bits. For carrying out computations, the register may be "divided" into sections, the sections being length of a data word, e.g. 16 bits. This dividing, although not being physical, may cause the register to operate so that computations in one sections does not affect the computation in another section. For example, the carry from a summation operation may be prevented to be carried over a section boundary.

The different registers R1 . . . R8 may be operated with each other so that performing computations (using the processor 340) may be done between two or more registers in a vector-like manner, with the limitation of stopping the carry at the section boundary. For example, the numbers (e.g. 16-bit integer words) in registers R1 and R2 may be added together, and the result may be placed in an output register. That is, with a single instruction, for example 8 numbers in register R1 may be added to corresponding 8 numbers in register R2, and the resulting 8 numbers may be placed in an output register. Also in-place computation may be done, that is, the numbers of R1 may be added into the values of R2, and the results stays in R2.

Here, it has been noticed as part of the invention that calculating a 2-dimensional transform such as a discrete wavelet transform (DWT) efficiently for a fixed size image block with SIMD architectures such as ARM NEON may be difficult. A 2D DWT may be performed by first calculating DWT in vertical direction and then calculating DWT in horizontal direction or vice versa. As explained, a parallel (vector-computing) architecture such as the NEON architecture loads and stores data as vectors which makes calculating the DWT in vertical direction simple, because operations can be carried out between registers in an efficient manner. However, it has been noticed that in a horizontal direction the computations may become tricky. This is because the architecture may allow adding, subtracting and multiplying data of different vectors only, and may not allow operations between vector elements of an individual vector in an efficient manner. In order to calculate the horizontal DWT, the elements of the same vector would need to be added, subtracted and multiplied together but the architecture may even be missing the required instructions to do so completely.

The vertical transform can be optimized effectively using vector computation instructions to calculate the transform for all columns simultaneously. However, this may not be possible or optimal for the horizontal transform due to the fact that, e.g., there may be no instructions for calculating addition, subtraction and multiplication of data which is stored in horizontal direction. Such a situation may arise e.g. with the ARM NEON processing unit. Thus calculating all rows simultaneously (in a parallel manner) may not be feasible for the horizontal transform. One way to solve this problem is to calculate vertical transform using e.g. NEON instructions and then calculate the horizontal transform using plain ARM instructions. However, it has been noticed here that this approach may not be optimal since e.g. the NEON hardware is faster than plain ARM instructions due to the nature of the SIMD processing. Other architectures than ARM NEON may display similar restrictions, where computation of a transform in one direction may be done in parallel but is more difficult in another direction.

It needs to be appreciated that other transforms than the discrete wavelet transform like Haar, Daubechies or complex wavelet transforms can be used. For example, Hadamard transform or a time-frequency transform such as a discrete cosine transform may be used.

FIGS. 4a, 4b, 4c, 4d and 4e illustrate processing of image data according to examples.

Figure 4A:
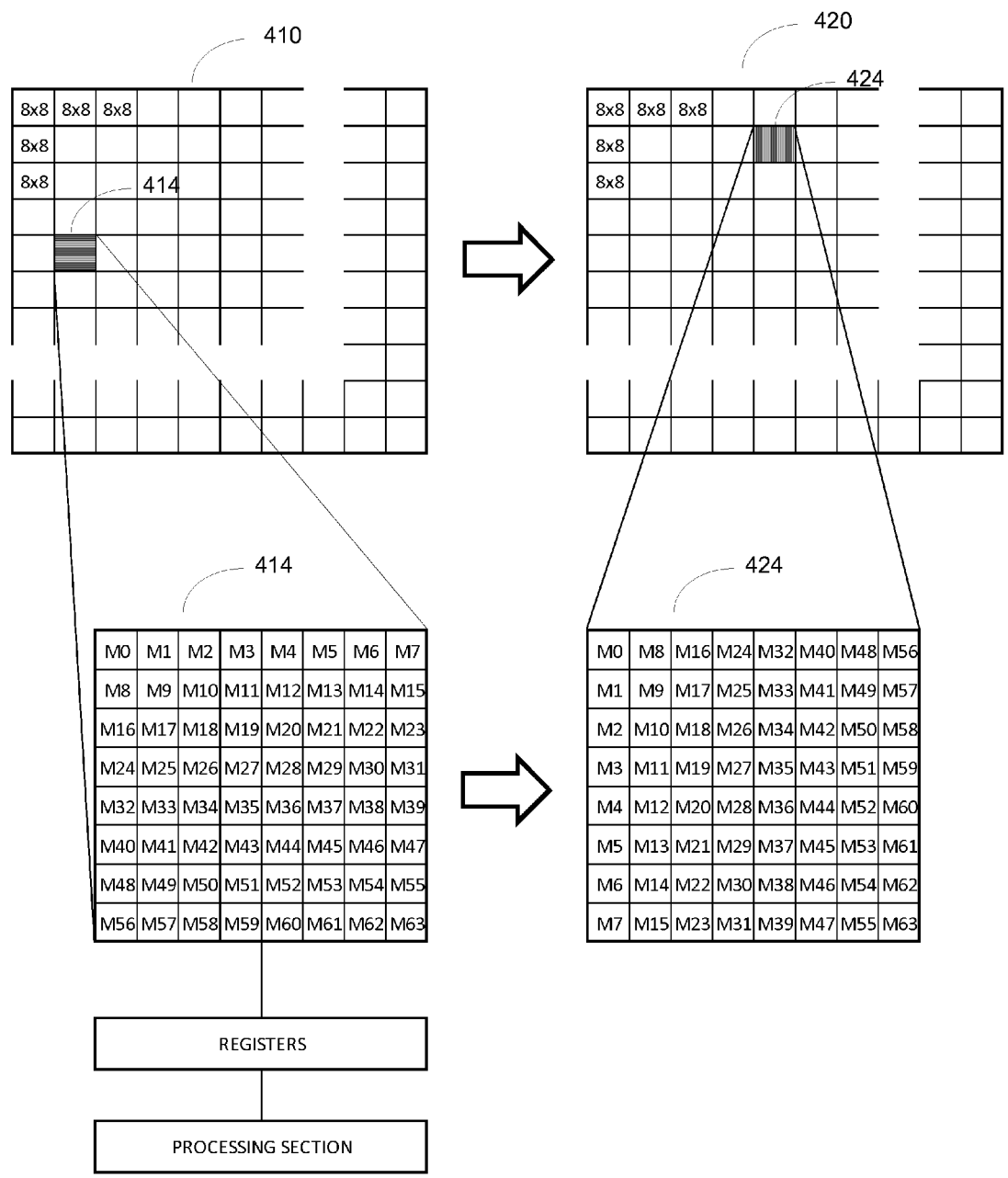
FIGS. 4a, 4b, 4c, 4d and 4e
illustrate processing of image data according to examples.

In FIG. 4a, the processing of a complete image 410 in a block-wise manned is depicted. The image data 410 may be divided into blocks, and the blocks may comprise pixels. For example, the image may comprise blocks of 8-by-8 pixels, with each pixel having a color value. An example of such a block is the block 414, located on the $5^{th}$ row and $2^{nd}$ column in the original image data. The block may comprise 64 pixels M0 . . . M63. Each line of pixels, e.g. M0 . . . M7 may be transferred to a register 330 as explained earlier, for processing with the processor 340. As a result of processing, the image data block 414 may be altered so that it is transposed in one way or the other. That is, the rows of block 414 have become columns of block 424 and columns of block 414 have become rows in block 424. This is illustrated with the pixel identifiers M0 . . . M63. In addition to the individual blocks being transposed, the whole image data set may be transposed, and the block 414 may become block 424 with a position on the $2^{nd}$ row and the $5^{th}$ column. It needs to be appreciated that there may be several ways of making a transposing operation, e.g. a matrix transpose as shown in FIG. 4a, or a rotation of 90 or 270 degrees.

Figure 4B:
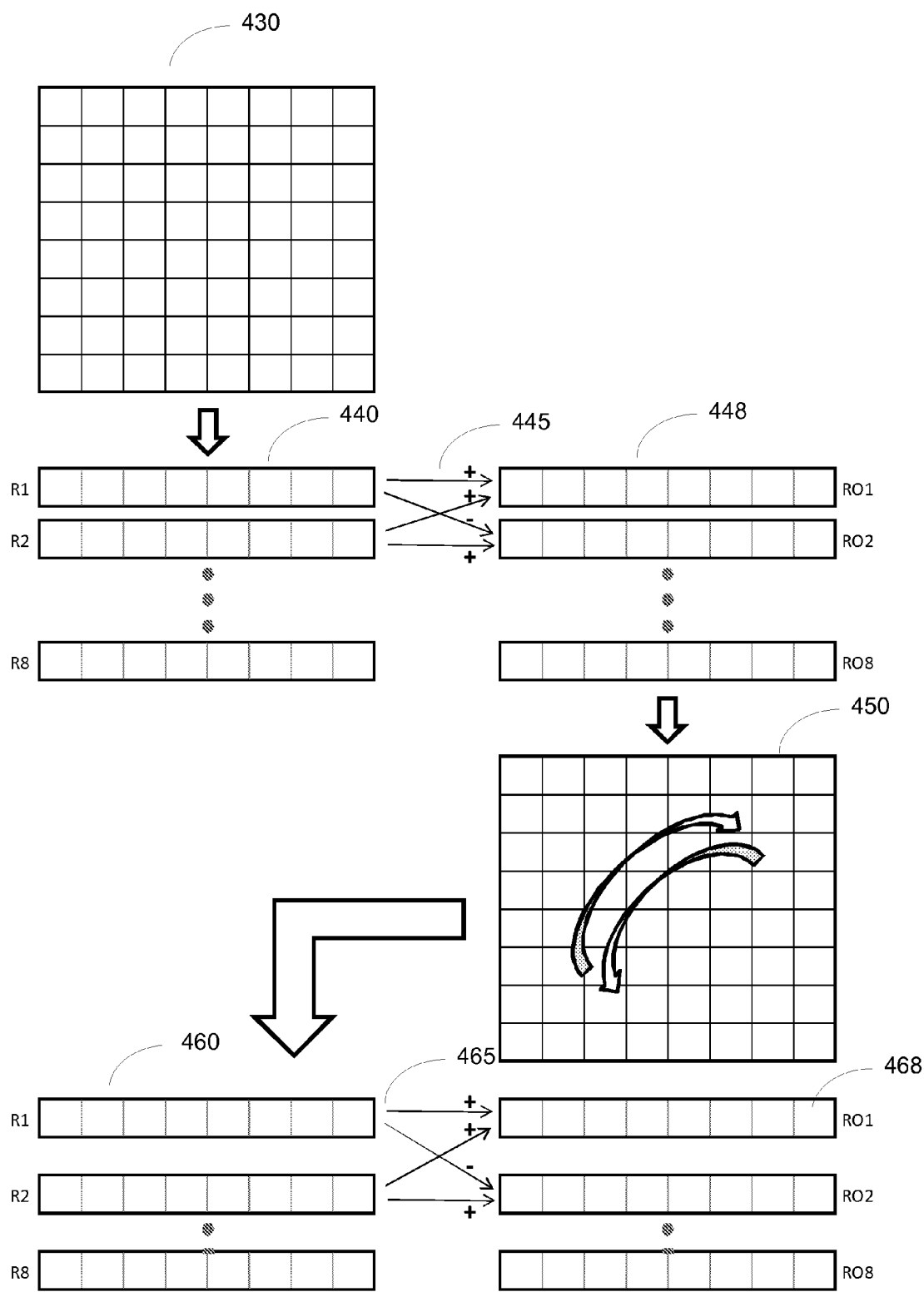

In FIG. 4b, the transform operations of an 8-by-8 image data block 430 are illustrated. As explained earlier, the input image data may be loaded onto registers 440 R1, R2, . . . , R8. In a transform operation 445 such as the discrete wavelet transform, e.g. registers R1 and R2 may be added together to achieve an output into an output register R01, and as another example, values in register R1 may be subtracted from values in register R2 to obtain an output value R02. It needs to be appreciated that by adding, subtracting and multiplying values in registers a transform 448 of input data may be created. For example, a wavelet transform in the vertical direction may be computed in this manner.

In order to make use of the vector-computing (parallel) processor architecture for the second direction (horizontal, in this case), a transpose operation 450 may be carried out. The transposed (partially transformed) image data may then be loaded onto the processor registers 460 and by carrying out transform operations 465 in a vector-computing manner, a complete image transform 468 may be achieved.

In other words, a transpose operation may be carried out to the image data after the vertical DWT has been calculated and then the vertical DWT may be calculated again for the transposed data. Effectively the second DWT calculates a horizontal DWT with respect to the original image data since the transpose operation has flipped columns and rows of the image data. This way the processor's vector (SIMD) instructions may be used to calculate both vertical and horizontal DWT transforms effectively. The transpose operation can also be used to speed up the inverse 2D DWT calculation in the same way.

An alternative operation for transposing operation instead of a matrix transpose is to use 90 or 270 degree rotation instead.

Figure 4C:
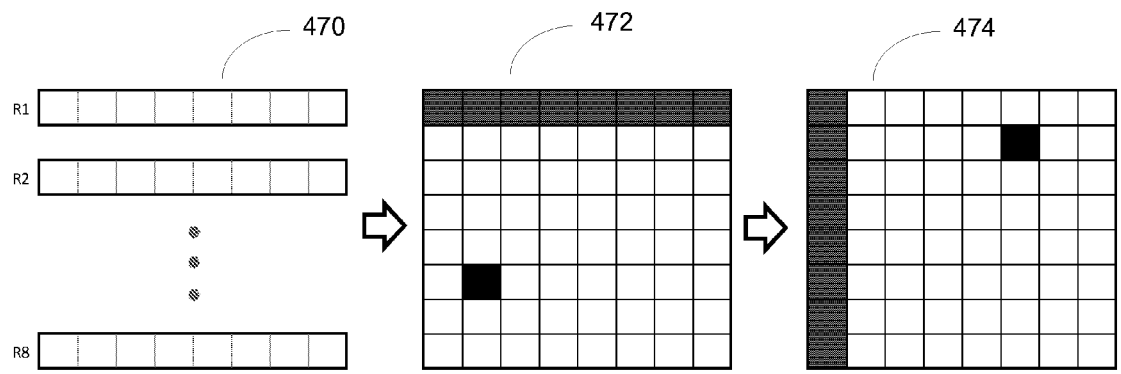

FIG. 4c illustrates the principle of a transposing operation in a register-memory arrangement. The data in registers 470 may be transferred to memory 472 for the purpose of transposing. The transposing itself may happen e.g. so that the data words (like the black square) are copied into a transposed location in another memory block 474. It is well known that image blocks may reside in memory as a contiguous string of values, or the values may be located in non-contiguous fragments in the memory. In the transposing, the image data will be flipped so that e.g. the first row of 472 (black rectangle) may become the first column in 474. The transposing may happen also so that the individual data elements are copied directly from the registers 470 into the memory block 474. In this approach, the copying may happen in a non-parallel manner.

Figure 4D:
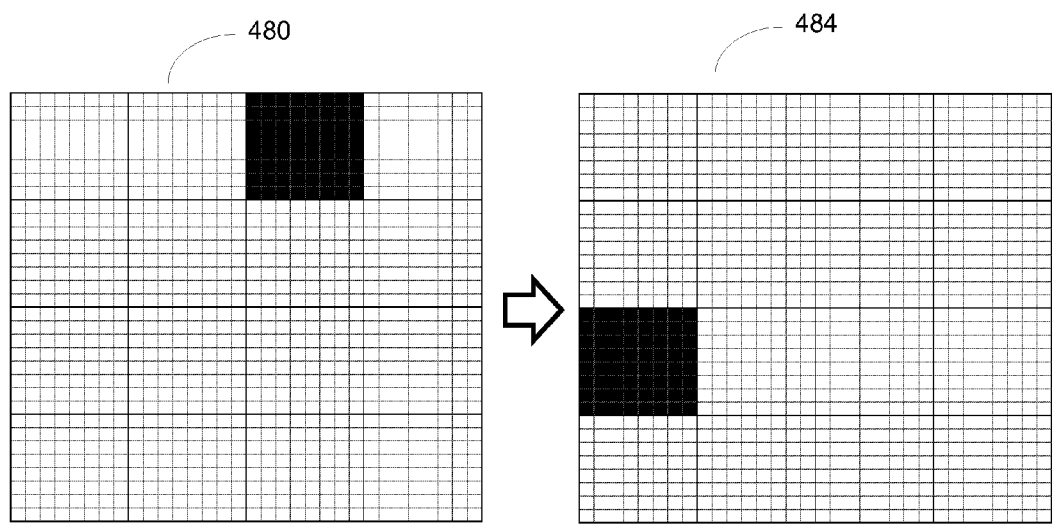

FIG. 4d illustrates block transform of image data for a complete image. In an input image data 480, the position of the individual data blocks may need to be transposed in addition to the block contents being transposed (as explained in FIG. 4c). In this case, a memory block (black square) may be copied into a transposed position, that is, the row and column counts interchanged. Such a copying may happen in a block-wise memory-to-memory transfer, for example using direct memory access, so that the individual elements (words) may not need to be transferred by copying.

Figure 4E:
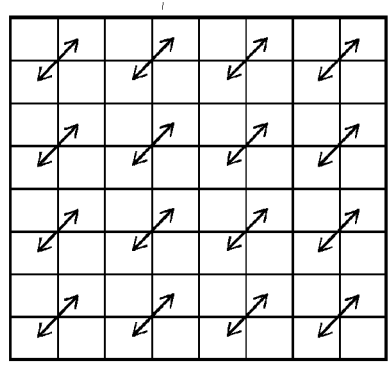
Figure 4E:
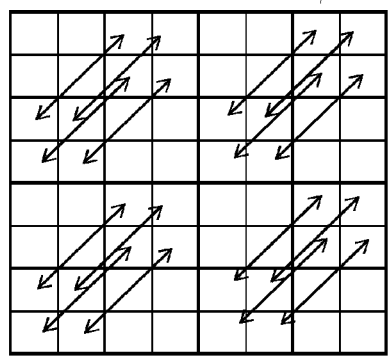
Figure 4E:
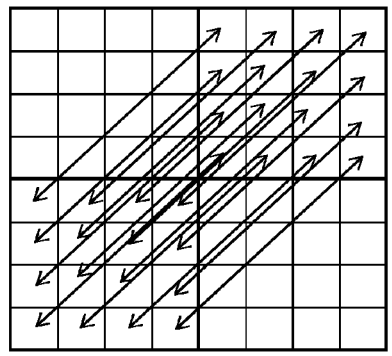

FIG. 4e illustrates a transpose operation of an 8-by-8 data block carried out using registers. As will be explained in the following, a transpose operation of an image block can also be calculated effectively using processor instructions acting on the registers, which may make it possible to calculate both the transforms (in two directions) and the transpose operation in between in a single pass. If the image block size is small enough, the whole image block can be stored in the processor registers without writing intermediate results into memory which may speed up the processing even further.

The data 490 to be transposed may reside in registers R1 . . . R8 as explained earlier, for example as a result of the transform operation in a first direction. The data 490 comprises 64 values M0 . . . M63 on 8 rows of 8 values each. The benefit of this is that the transfer of data between the registers 330 and the memory 310 may not be needed. In any case, the transfer of data between the registers and memory may happen in a parallel manner, if such transfer is needed. The transfers may also be pipelined to make them faster.

In a first step 491 of a register based transform operation, each 2-by-2 block is transposed. That is, the elements across the diagonal are swapped. In practice, the registers R1 and R2 may be manipulated so that the swapping happens in a parallel manner. The instruction set of the vector processor may support such a manipulation directly, and thereby enable the swap to happen in one clock cycle for the registers R1 and R2. The first step for the whole 8-by-8 block can then be done in 4 clock cycles. The resulting data block 492 comprises half of the elements in original positions and half of the elements swapped with their diagonal neighbor.

In a second step 493 of a register based transform operation, each 4-by-4 block is transposed. This happens by swapping the 2-by-2 blocks across a diagonal with each other. Again, this swapping may be made to happen in a parallel manner: 4 elements of the register R1 are interchanged with 4 elements of the register R3, and the same is done for the register pairs R2-R4, R5-R7 and R6-R8. The arrows indicate the movement of the individual values, although the swapping operations happen again in a vector-like manner in 4 clock cycles. The resulting data block 494 comprises 16 elements in original places (diagonals of the 4-by-4 blocks), and the rest have been moved. The diagonal 4-by-4 blocks (upper left and lower right) are already complete.

In a third step 495, the 8-by-8 block is transposed in terms of its 4-by-4 sub-blocks by switching the values of the non-diagonal 4-by-4 blocks (upper right and lower left). That is, 4 values of the register R1 are swapped with 4 values of the register R5, and the same is done for pairs R2-R6, R3-R7 and R4-R8. Again, the operation takes 4 clock cycles. The result 496 is a completely transposed 8-by-8 data block. This data block now resides in a direction in the registers that it can be directly subjected to an image transform by utilizing the vector computing capabilities of the processor.

It needs to be appreciated that the order in which phases 491, 493 and 495 are executed may not matter, i.e., the swap operations can be executed in any order and the result may still be the same.

Figure 5A:
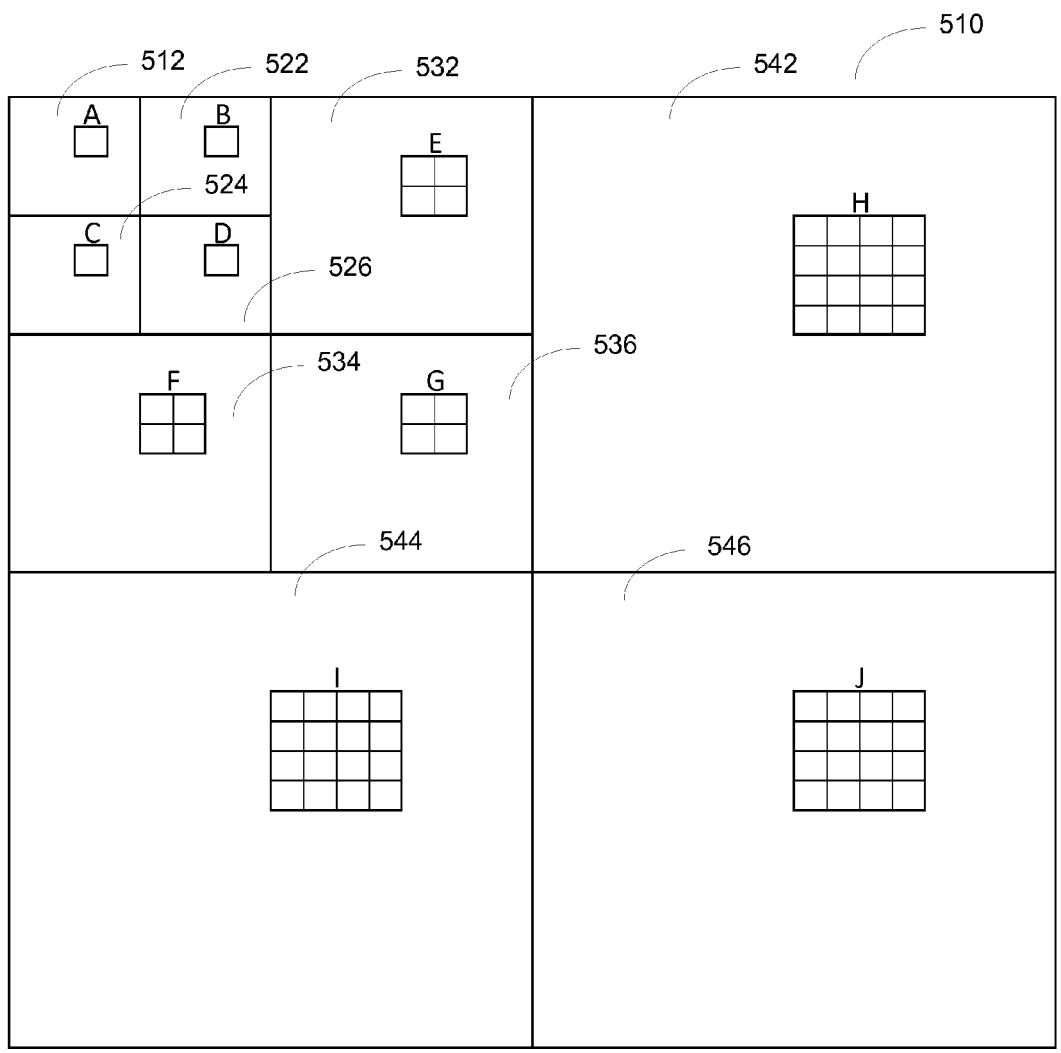
FIGS. 5a, 5b and 5c
illustrate processing of image data employing a wavelet transform.
Figure 5B:
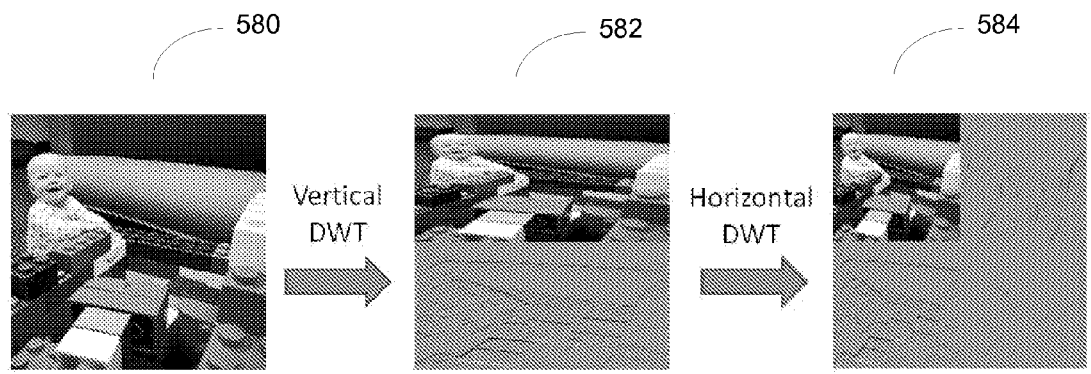
Figure 5C:
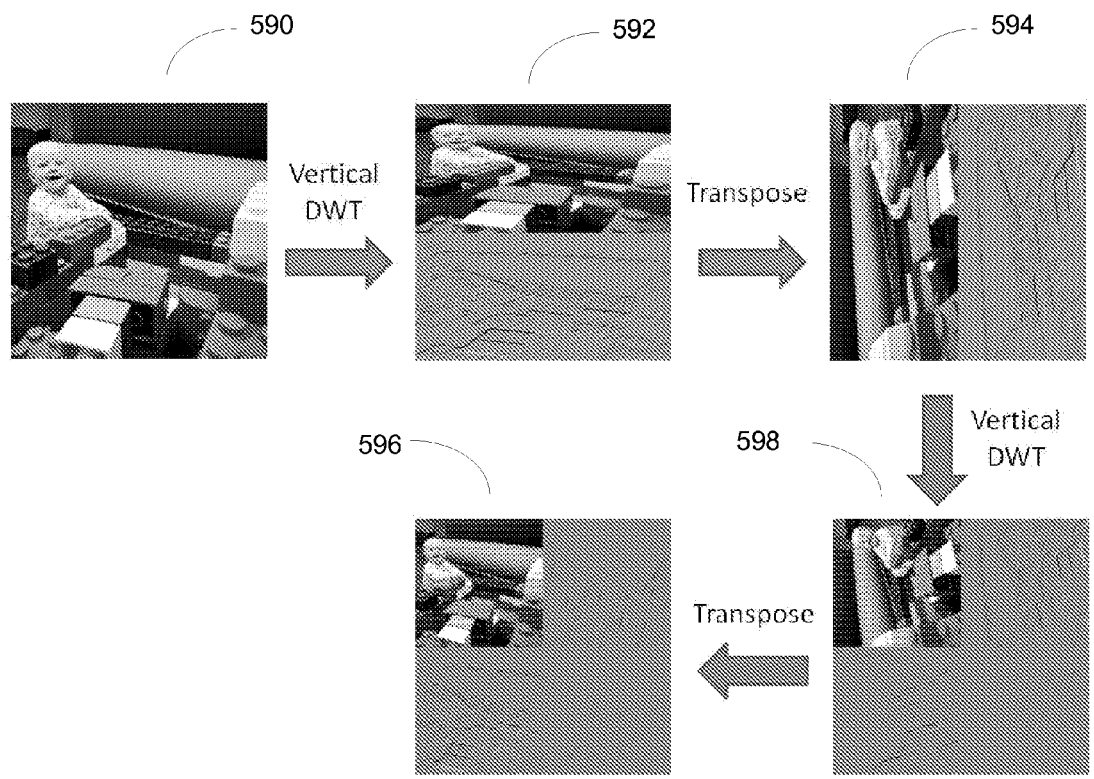

FIGS. 5a, 5b and 5c illustrate processing of image data employing a wavelet transform.

FIG. 5a illustrates the concept of a discrete wavelet transform and the location of data in memory for such a transform. A discrete wavelet transform (DWT) is a method where a signal is represented as a series of high and low frequency wavelets. A 2-dimensional (2D) discrete wavelet transform is an extension of the DWT for 2D signals, typically used for image processing. One example of a common DWT is the Haar transform, others being Daubechies and complex wavelet transforms. A 2-dimensional DWT may be used in image compression and image noise reduction.

The calculation of a DWT takes place, as a summary, so that the DWT for a signal is performed by calculating one level of decomposition using a high pass filter and a low pass filter, storing the results in a filter bank and recursively calculating new levels of decomposition for the low pass filtered signal until the desired level of decompositions has been reached. The original signal can be reconstructed by calculating an inverse DWT.

The DWT data 510 is often depicted in a manner where the different filtered levels of the image can be seen. In FIG. 5a, the low-pass filtered image 512 is shown next to the third-level high-pass filtered images 522, 524 and 526. The second-level high-pass filtered images 532, 534 and 536 are shown next to right and down. The first-level high-pass filtered images 542, 544 and 546 are take up ¾ of the coefficients. The different parts of the image (different levels of filtering) may be represented by different numbers of bits per coefficient, or they may all be 16-bit numbers.

In the memory, the image data may be arranged differently. For example, if the transform is carried out in 8-by-8 blocks, the blocks are naturally arranged in the memory as contiguous memory blocks 550. The correspondence between the transformed image representation 510 and the memory block is shown with letters.

The letters A, B, C and D indicate individual coefficients, letters E, F and G indicate 2-by-2 coefficient blocks, and letters H, I and J indicate 4-by-4 coefficient blocks. These are arranged in the memory next to each other as shown in 550 as a result of carrying out a transform for an image block.

In FIG. 5b, the discrete wavelet transform of an image is illustrated. The 2D DWT for an image 580 can be performed by first calculating DWT for each column of the image in vertical direction, obtaining a semi-transformed image 582, and then calculating DWT for each row in horizontal direction or vice versa to obtain the result 584. This method may be optimized by dividing the image into fixed size blocks— 8×8 pixels for example—and then calculating all decomposition levels of the vertical DWT in a single pass, as explained earlier. This speeds up the processing since each pixel in the image block is read and written just once saving memory bandwidth. The same can then be done for the horizontal DWT.

FIG. 5c illustrates the 2-dimensional DWT processing where a transpose operation is employed. First, the input image data 590 may be divided into blocks, for example 8×8 pixel blocks. For each block, the following operations are then carried out, with an example of using the NEON processor architecture:
1. Calculate a vertical DWT transform 592 using vadd, vsub, vmul and vmla NEON instructions to process multiple columns in parallel, as explained earlier (FIG. 4b);
2. Calculate transpose 594 for the image block using vtrn and vswp NEON instructions, and possibly memory transfers, as explained earlier (FIGS. 4c-4e)
3. Calculate another vertical DWT transform 598 using vadd, vsub, vmul and vmla NEON instructions to process multiple columns in parallel, in effect computing a horizontal DWT with respect to the original input data;
4. Possibly calculate another transpose 596 for the image block using vtrn and vswp NEON instructions to revert the transpose done in step 2.

It needs to be appreciated that although the process has been described to happen in steps, the various steps may be intermingled into a sequence of commands to be carried out on the input image data.

The inverse 2D DWT processing may be done as follows. First, the image is divided into fixed size blocks, for example 8×8 pixel blocks, according to how the image was originally transformed. Then for each block, the following operations may be carried out:
1. Calculate vertical inverse DWT transform using vadd, vsub, vmul and vmla NEON instructions to process multiple columns in parallel;
2. Calculate transpose for the image block using vtrn and vswp NEON instructions;
3. Calculate another vertical inverse DWT transform using vadd, vsub, vmul and vmla NEON instructions to process multiple columns in parallel;
4. Possibly calculate another transpose for the image block using vtrn and vswp NEON instructions to revert the transpose done in step 2.

Step 4 can be skipped for 2D DWT and inverse 2D DWT if it's acceptable that the DWT produces a transposed result. As a special case, to save processing time in transmission or filtering, step 4 may be omitted from both the forward transform and the inverse transform, and since both transforms contain one transposing operation, their effects will cancel each other out, and the resulting image data is oriented properly. The transformed images may also be stored onto a mass storage in transposed form so that when they are decoded, the resulting image shows properly.

The transformed computer images may be embodied as a data structure on a non-transitory computer readable medium such as the mass memory, where there are coefficients of transformed image data and control codes for decoding the image. The control codes may be arranged to control decoding of the image data, for example so that the control codes comprise an indicator indicating that the decoding can be carried out by a decoding process with two transform operations and a transposing operation in between the transform operations such that a further transposing operation can be avoided. The control codes may comprise a transpose type indicator indicating the type of a transpose operation for carrying out the decoding process, for example a matrix transpose operation, or a rotation. In this manner, the correct transposing operation may be chosen, and a final transposing operation may be avoided.

Figure 6:
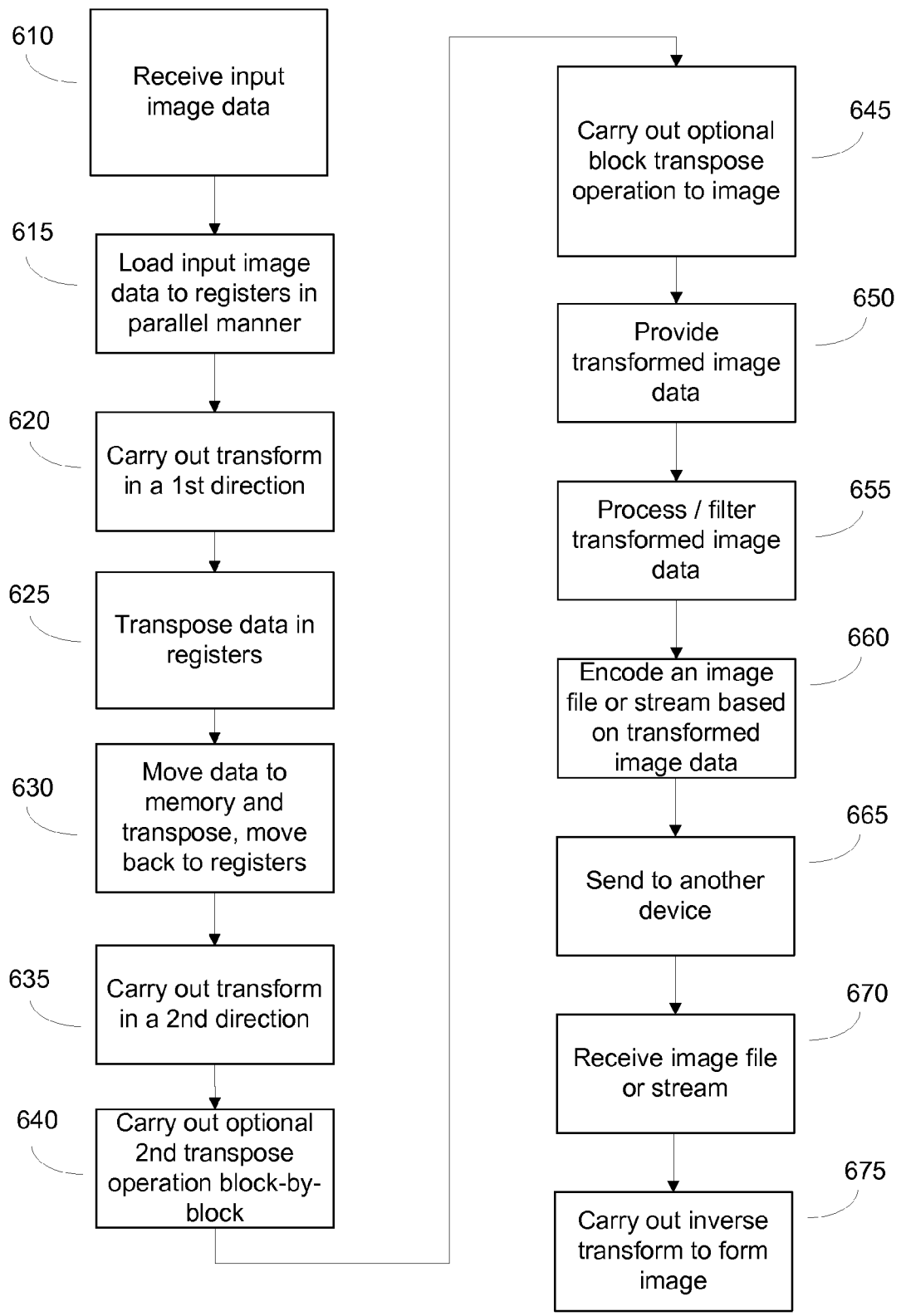
FIG. 6 shows an example of an image processing method employing a transposing operation.

FIG. 6 shows an example of an image processing method employing a transposing operation. In phase 610, input image data may be obtained from a memory, mass storage, camera, or communications means, as explained earlier. In phase 615, the image data may be loaded into registers of the processor, e.g. in blocks, in a parallel manner. In phase 620, a transform may be carried out in a first direction with respect to the original image data.

In phase 625, the data in registers may be transposed to be able to utilize vector computation for the $2^{nd}$ direction transform. This may happen for example in a manner shown in FIG. 4e. In addition to this, or instead of this, the transposing may happen (e.g. block transpose) in phase 630 using memory operations. Here, data may be transferred from the registers to memory, transposed, and transferred back to the registers.

In phase 630, a transform in a second direction with respect to the original image data may be carried out. This may happen so that the vector processing capability of the processor is employed, and since this is applied to the transposed data, a transform in a second direction is created. In phase 640, a second transposing operation may be carried out to re-align the transposed data with the original image data. This may be useful e.g. if a low-pass filtered section of the wavelet transformed image is used for some purpose. This transpose operation may also include an optional block transpose operation as in FIG. 4d.

As a result, transformed image data may be provided in phase 650 for storing, further operations like filtering, or for sending to another device using the communications means. That is, the transformed image data may be processed or filtered, e.g. by truncating or rounding small high-frequency components to zero in phase 655. The transformed image data may also be encoded into an image file or a stream (in case of video). This image file or stream may comprise control codes for decoding the image, e.g. for controlling the transposing operations. For example said input image data pertains to a still image and said second transformed image data is used in a coded image such as a JPEG2000 image; or said input image data pertains to a sequence of images such as a video and said second transformed image data is used in a coded image stream such as a Motion JPEG2000 stream. The image may also be sent to another device in phase 665 in encoded form or even as raw transform coefficients. At the other device, or at the same device, the image file or stream may be received in phase 670 and decoded by carrying out inverse transform to the image data in phase 675.

An advantage of the presented solution is that 2D DWT and inverse 2D DWT may be calculated with fewer ARM and NEON instructions and using less memory bandwidth compared to earlier solutions. Therefore the presented solution may be more efficient. Below, an approximate comparison of different methods is given.

For the Neon & Arm method, where only half of the transform is carried out in the NEON instructions (in parallel), the computation time may be as follows:
Three level Haar transform for 8×8 block in vertical direction: 14 clock cycles
Transfer result from Neon to Arm registers: 64 clock cycles
Three level Haar transform for 8×8 block in horizontal direction on Arm: 112 clock cycles
Total: 14+64+112=190 clock cycles
Clock cycles per pixel: 2.969

For the Neon & store/load memory method, where a transpose operation is carried out in memory in between the two different directions of transforms, the computation time may be as follows:
Three level Haar transform for 8×8 block in vertical direction: 14 clock cycles
Store result to memory linearly (in parallel): 8 clock cycles
Load result from memory transposed: 64 clock cycles
Three level Haar transform for 8×8 block in vertical direction: 14 clock cycles
Total: 14+8+64+14=100 clock cycles
Clock cycles per pixel: 1.563

For the NEON transpose optimized method, where the transpose is carried out in the registers, the computation time may be as follows:
Three level Haar transform for 8×8 block in vertical direction: 14 clock cycles
Transpose for 8×8 block: 12 clock cycles
Three level Haar transform for 8×8 block in vertical direction: 14 clock cycles
Total: 14+12+14=40 clock cycles
Clock cycles per pixel: 0.625

The various embodiments may thus provide advantages. For example, carrying out a transpose operation in an image processing transform may enable to use the processor architecture's computational capabilities more optimally. Carrying out a register-based transpose operation may enhance the speed of computations by avoiding non-parallel memory transfer operations. These and other advantages may improve the operation of e.g. JPEG2000 image encoding and decoding, wavelet based video coding, image processing such as smoothing or edge-enhancement filtering, and others.

The various embodiments of the invention can be implemented with the help of computer program code that resides in a memory and causes the relevant apparatuses to carry out the invention. For example, a device may comprise circuitry and electronics for handling, receiving and transmitting data, computer program code in a memory, and a processor that, when running the computer program code, causes the device to carry out the features of an embodiment. Yet further, a network device like a server may comprise circuitry and electronics for handling, receiving and transmitting data, computer program code in a memory, and a processor that, when running the computer program code, causes the network device to carry out the features of an embodiment.

The present invention is not limited solely to the above-presented embodiments, but it can be modified within the scope of the appended claims.

The invention claimed is:

1. A method, comprising:
receiving input image data,
performing a first transform to said input image data in a first direction to obtain first transformed image data,
performing a transposing operation to said first transformed image data by a matrix transposition or by rotation through a predefined angle to obtain first transposed image data, and
performing a second transform to said first transposed image data, said second transform in a second direction, to obtain second transformed image data from which an image is able to be formed, wherein the first transform and the second transform are two dimensional vertical discrete wavelet transforms (DWT) that use a vector computing architecture or a single instruction multiple data architecture (SIMD) to load and store data as a vector.

2. A method according to claim 1, comprising:
performing said first transform and said second transform in a processor, wherein each of multiple columns of the said input image of the first transform and each of multiple columns of the said first transposed image data are processed in a parallel manner respectively, and
performing transposing operation at least partially using registers of said processor.

3. A method according to claim 2, comprising:
performing said transposing operation by swapping element values of registers in register pairs iteratively such that individual element values are moved to transpose positions with respect to an image block being processed.

4. A method according to claim 1, comprising:
performing a transposing operation to said second transformed image data.

5. A method according to claim 1, wherein said input image data is an image block of an image, and said image is processed in a block-by-block manner, and said method comprises:
performing a block transposing operation to said second transformed image data with respect to the image.

6. A method according to claim 1, comprising:
processing said second transformed image data thereby causing said input image data to be filtered, and
forming an inverse transform of the processed second transformed image data to obtain filtered image data.

7. A method according to claim 1, wherein said first and second transforms are performed in a processor having the SIMD architecture.

8. An apparatus comprising at least one processor, and memory including computer program code, the memory and the computer program code configured to, with the at least one processor, cause the apparatus to perform at least the following:
receive input image data for processing in a computer system,
perform a first transform to said input image data, said transform in a first direction, to obtain first transformed image data, perform a transposing operation to said first transformed image data by a matrix transposition or by a rotation through a predefined angle to obtain first transposed image data, and perform a second transform to said first transposed image data, said second transform in a second direction, to obtain second transformed image data from which an image is able to be formed, wherein the first transform and the second transform are two dimensional vertical discrete wavelet transforms (DWT) that use a vector computing architecture or a single instruction multiple data architecture (SIMD) to load and store data as a vector.

9. An apparatus according to claim 8, comprising computer program code to cause the apparatus to:

perform said first transform and said second transform in a processor, wherein each of multiple columns of the said input image of the first transform and each of multiple columns of the said first transposed image data are processed in a parallel manner respectively, and perform said transposing operation at least partially using registers of said processor.

10. An apparatus according to claim 9, comprising computer program code to cause the apparatus to:

perform said transposing operation by swapping element values of registers in register pairs iteratively such that individual element values are moved to transpose positions with respect to the image block being processed.

11. An apparatus according to claim 8, comprising computer program code to cause the apparatus to:

perform a transposing operation to said second transformed image data.

12. An apparatus according to claim 8, wherein said input image data is an image block of an image, and said image is processed in a block-by-block manner, and said apparatus comprises computer program code to cause the apparatus to:

perform a block transposing operation to said second transformed image data with respect to the image data.

13. An apparatus according to claim 8, comprising computer program code to cause the apparatus to:

process said second transformed image data and thereby to cause said input image data to be filtered, and form an inverse transform of the processed second transformed image data to obtain filtered image data.

14. An apparatus according to claim 8, wherein said first and second transforms are arranged to be performed in a processor of the apparatus having the SIMD architecture.

15. A computer program product embodied on a non-transitory computer readable medium, comprising computer program code configured to, when executed on at least one processor, cause an apparatus or a system to:

receive input image data for processing in a computer system, perform a first transform to said input image data, said transform in a first direction, to obtain first transformed image data, perform a transposing operation to said first transformed image data by a matrix transposition or by a rotation through a predefined angle to obtain first transposed image data, and perform a second transform to said first transposed image data, said second transform in a second direction, to obtain second transformed image data from which an image is able to be formed, wherein the first transform and the second transform are two dimensional vertical discrete wavelet transforms (DWT) that use a vector computing architecture or a single instruction multiple data architecture (SIMD) to load and store data as a vector.

16. A computer program product according to claim 15, comprising computer program code to cause the apparatus or system to:

perform said first transform and said second transform in a processor, wherein each of multiple columns of the said input image of the first transform and each of multiple columns of the said first transposed image data are processed in a parallel manner respectively, and perform said transposing operation at least partially using registers of said processor.

17. A computer program product according to claim 16, comprising computer program code to cause the apparatus or system to:

perform said transposing operation by swapping element values of registers in register pairs iteratively such that individual element values are moved to transpose positions with respect to the image block being processed.

18. A computer program product according to claim 15, comprising computer program code to cause the apparatus or system to:

perform a transposing operation to said second transformed image data.

19. A computer program product according to claim 15, wherein said input image data is an image block of an image, and said image is processed in a block-by-block manner, and said computer program product comprises computer program code to cause the apparatus or system to:

perform a block transposing operation to said second transformed image data with respect to the image data.

20. A computer program product according to claim 15, comprising computer program code to cause the apparatus or system to:

process said second transformed image data and thereby to cause said input image data to be filtered, and form an inverse transform of the processed second transformed image data to obtain filtered image data.

21. A method according to claim 1 wherein performing a transposing operation comprises transposing columns of said first transformed image data to rows and rows of said first transformed image data to columns.

22. An apparatus according to claim 8 wherein performing a transposing operation comprises transposing columns of said first transformed image data to rows and rows of said first transformed image data to columns.

23. A computer program product according to claim 15 wherein performing a transposing operation comprises transposing columns of said first transformed image data to rows and rows of said first transformed image data to columns.

* * * * *